US012811195B2

(12) United States Patent
Ma et al.

(10) Patent No.: US 12,811,195 B2
(45) Date of Patent: Nov. 24, 2026

(54) PREPARATION METHOD OF FLAME-RETARDANT ULTRATHIN PEO-BASED SOLID ELECTROLYTE

(71) Applicant: Northwestern Polytechnical University, Xi'an (CN)

(72) Inventors: Yue Ma, Xi'an (CN); Ting Liu, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 464 days.

(21) Appl. No.: 18/409,815

(22) Filed: Jan. 11, 2024

(65) Prior Publication Data

US 2024/0380004 A1 Nov. 14, 2024

(30) Foreign Application Priority Data

May 9, 2023 (CN) ........................ 202310513066.X

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 2300/0082; H01M 2300/0085
See application file for complete search history.

(56) References Cited

U.S. PATENT DOCUMENTS

2019/0097261 A1* 3/2019 Miller ................. H01M 10/052
2021/0210782 A1* 7/2021 Miller ............... H01M 10/0525

FOREIGN PATENT DOCUMENTS

CN 110078973 A 8/2019
CN 113773555 A 12/2021

(Continued)

OTHER PUBLICATIONS

Gray-Wannell, et al. Clay Minerals (2020), 55, 184-193 (Year: 2020).*

(Continued)

*Primary Examiner* — Sadie White
(74) *Attorney, Agent, or Firm* — Nitin Kaushik

(57) ABSTRACT

A preparation method of a flame-retardant ultrathin PEO-based solid electrolyte is disclosed. The method includes the following steps: preparing a CN support layer; synthesizing a flame retardant-loaded multifunctional filler: HNT@TMP; mixing and stirring PEO, LiTFSI, and HNT@TMP in a certain ratio in acetonitrile to obtain PEO-based solid electrolyte slurry; coating both sides of the CN support layer obtained in step S1 with the PEO-based solid electrolyte slurry obtained in step S3, and performing drying; and performing hot pressing to obtain a PEO-based solid electrolyte. By adopting the preparation method of the flame-retardant ultrathin PEO-based solid electrolyte, the electrochemical performance and flame retardance of a PEO-based solid polymer electrolyte are improved through a multifunctional flame-retardant filler (HNT@TMP), and the mechanical strength of the ultrathin PEO electrolyte is ensured through porous cellulose nanopaper (CN) with excellent mechanical flexibility and thermal stability, whereby the development of high energy density is facilitated.

5 Claims, 15 Drawing Sheets

(56) References Cited

FOREIGN PATENT DOCUMENTS

| | | | |
|---|---|---|---|
| CN | 114759253 | A | 7/2022 |
| IN | 201711023390 | A | 1/2019 |
| WO | 2023050316 | A1 | 4/2023 |

OTHER PUBLICATIONS

Yao, et al., Journal of Power Sources 144 (2005) 170-175 (Year: 2005).*
Zhou, et al., Chemical Engineering Journal 464 (2023) 142537 (Year: 2023).*
Machine Translation of CN110078973A (Year: 2019).*

* cited by examiner

Embodiment 1

Comparative Example 2

PEO-based solid electrolyte obtained in Comparative Example 2

Flame-retardant ultrathin PEO-based solid electrolyte with high ion migration number obtained in Embodiment 1 of the present invention

PREPARATION METHOD OF FLAME-RETARDANT ULTRATHIN PEO-BASED SOLID ELECTROLYTE

CROSS REFERENCE TO THE RELATED APPLICATIONS

This application is based upon and claims priority to Chinese Patent Application No. 202310513066.X, filed on May 9, 2023, the entire contents of which are incorporated herein by reference.

TECHNICAL FIELD

The present invention relates to the technical field of lithium battery materials, and more particularly to a preparation method of a flame-retardant ultrathin PEO-based solid electrolyte.

BACKGROUND

The current lithium ion batteries have been unable to meet the increasing demand of people in terms of energy density, cycle life, and safety. It is one of the effective strategies to achieve lithium batteries with high specific energy and high safety by using a solid electrolyte and matching a lithium metal negative electrode to assemble solid lithium metal batteries.

Polyethylene oxide (PEO)-based solid electrolytes among multiple solid electrolytes have been widely studied because of easy processing, good lithium salt solubility, and stable lithium metal negative electrode.

However, PEO is a semi-crystalline polymer material, which leads to the limited migration of lithium ions in polymer and affects the capacity of the battery. At the same time, the mechanical strength of PEO is not enough to inhibit the growth of lithium dendrites, so as not to match a positive electrode with high surface capacity. Moreover, the thickness of PEO solid electrolytes used at present is large, which is not conducive to achieving high energy density.

In addition, PEO is a typical flammable polymer in a PEO-based solid polymer electrolyte system, which has a potential safety hazard similar to an organic electrolyte and is very fatal when applied to batteries. Aiming at the problem of flammability, the polymerization flame retardance is generally improved by adding a flame retardant (FR) in the prior art. An organophosphorus flame retardant has become the most commonly used flame retardant additive because of good thermal stability, high environmental safety, high flame retardant efficiency, and low cost. However, the incompatibility between phosphorus flame retardants and metal anodes will affect the performance of the battery.

SUMMARY

In order to solve the above problem, the present invention provides a preparation method of a flame-retardant ultrathin PEO-based solid electrolyte. The electrochemical performance and flame retardance of a PEO-based solid polymer electrolyte are improved through a multifunctional flame-retardant filler (HNT@TMP), and the mechanical strength of the ultrathin PEO electrolyte is ensured through porous cellulose nanopaper (CN) with excellent mechanical flexibility and thermal stability, whereby the development of high energy density is facilitated.

In order to achieve the above object, the present invention provides a preparation method of a flame-retardant ultrathin PEO-based solid electrolyte, including the following steps:

S1: preparing a CN support layer;

S2: synthesizing a flame retardant-loaded multifunctional filler: HNT@TMP;

S3: mixing and stirring PEO, lithium bis(trifluoromethanesulphonyl)imide (LiTFSI), and HNT@TMP in a certain ratio in acetonitrile to obtain PEO-based solid electrolyte slurry;

S4: coating both sides of the CN support layer obtained in step S1 with the PEO-based solid electrolyte slurry obtained in step S3, and performing drying; and S5: performing hot pressing to obtain a PEO-based solid electrolyte.

Preferably, step S1 specifically includes the following sub-steps:

S11: uniformly dispersing CN raw materials in an aqueous solution to obtain a precursor solution;

S12: performing vacuum filtration on the obtained precursor solution; and

S13: performing drying.

Preferably, the CN raw materials are dispersed in the aqueous solution by an ultrasonic wall breaker in step S11.

The power of the ultrasonic wall breaker is 650 W, the dispersion time is 10-30 min, the drying temperature is 100° C., and the drying time is 12 hours.

Preferably, TMP is adsorbed in the interior of HNT by vacuum impregnation to synthesize HNT@TMP in step S2.

Preferably, step S2 specifically includes the following sub-steps:

S21: ultrasonically blending an HNT solution and a TMP solution for 1 hour, transferring the blended solutions into a vacuum bottle, and performing vacuum impregnation for 1 hour;

S22: repeatedly performing step S21 for four times to obtain a mixed solution;

S23: storing the mixed solution under normal pressure for 5-7 days to further increase the loading amount of TMP, so as to obtain a mixed solution with HNT@TMP precipitated;

S24: separating HNT@TMP from the mixed solution by a centrifugal machine; and

S25: drying the separated HNT@TMP in an oven at 60° C.

Preferably, the proportion of HNT@TMP is 40%, the ratio of PEO and LiTFSI is [EO/Li+]=16:1, and the stirring time is 12 hours, in step S3.

Preferably, both sides of the CN support layer are coated with the PEO-based solid electrolyte slurry using a coating machine in step S4.

The coating scale of the PEO-based solid electrolyte slurry is 15-35. The drying process includes: placing at room temperature for 12 hours and then placing in a vacuum oven at 60° C. for 12 hours.

Preferably, the hot pressing pressure is 40 MPa, the hot pressing temperature is 70° C., and the hot pressing time is 10-30 min, in step S5.

Preferably, the thickness of the CN support layer in step S1 is 5-50 μm.

The present invention has the following beneficial effects.

1. A flame retardant trimethyl phosphate (TMP) is encapsulated in a halloysite nanotube (HNT), which inhibits a side reaction generated between the flame retardant dissolved directly in an electrolyte and a lithium metal negative electrode. However, in the thermal runaway process of a battery, due to the increase of temperature, the flame retardant in the HNT gasifies and captures free radicals in the combustion process of polymer, thus effectively inhibiting the combustion of the polymer electrolyte.

2. The unique charge distribution structure of "positive inside and negative outside" of the HNT can promote the dissociation of lithium salt and produce more freely conductible lithium ions, thereby accelerating the transmission of the lithium ions in the PEO-based electrolyte.
3. The mechanical strength of the ultrathin PEO electrolyte is ensured through porous cellulose nanopaper (CN) with excellent mechanical flexibility and thermal stability, whereby the development of high energy density is facilitated.

That is to say, a multifunctional HNT@TMP flame-retardant filler matches the ultrathin porous cellulose nanopaper (CN) with mechanical flexibility and thermal stability as a support layer, which can achieve the flame retardance, excellent mechanical performance and electrochemical performance of the PEO-based solid electrolyte, achieves ultrathin performance, and is conducive to achieving high energy density of a lithium battery.

The technical solution of the present invention will be described in further detail below through the drawings and the embodiments.

DETAILED DESCRIPTION OF THE EMBODIMENTS

Figure 1:
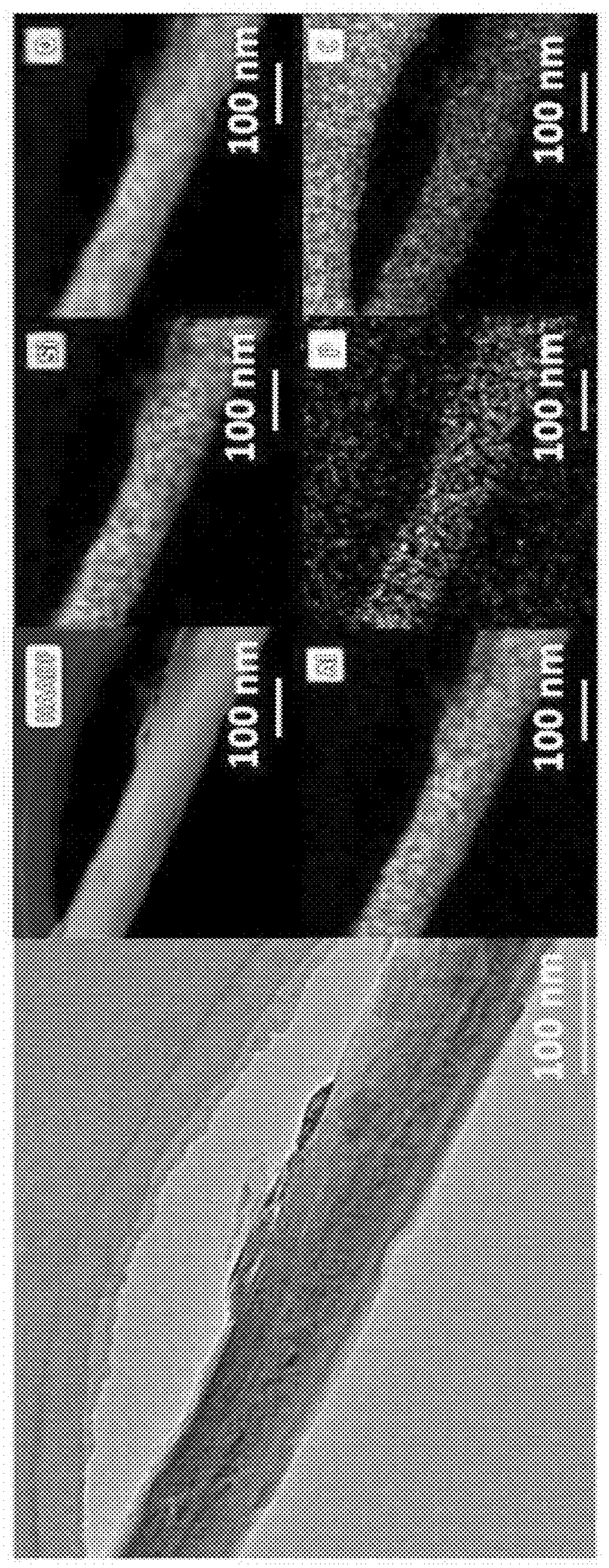
FIG. 1 is a TEM diagram of a multifunctional flame-retardant filler HNT@TMP prepared in Embodiment 1 of the present invention.

The present invention will be further described with reference to the drawings. It should be noted that this embodiment is based on this technical solution and gives a detailed implementation and a specific operation process. However, the protection scope of the present invention is not limited to this embodiment.

A preparation method of a flame-retardant ultrathin PEO-based solid electrolyte includes the following steps:

S1: Prepare a CN support layer.

The thickness of the CN support layer in step S1 is 5-50 μm.

Preferably, step S1 specifically includes the following sub-steps:

S11: Uniformly disperse CN raw materials in an aqueous solution to obtain a precursor solution.

Preferably, the CN raw materials are dispersed in the aqueous solution by an ultrasonic wall breaker in step S11.

The power of the ultrasonic wall breaker is 650 W, the dispersion time is 10-30 min, the drying temperature is 100° C., and the drying time is 12 hours.

S12: Perform vacuum filtration on the obtained precursor solution.

S13: Perform drying.

S2: Synthesize a flame retardant-loaded multifunctional filler: HNT@TMP.

Preferably, TMP is adsorbed in the interior of HNT by vacuum impregnation to synthesize HNT@TMP in step S2.

Preferably, step S2 specifically includes the following sub-steps:

S21: Ultrasonically blend an HNT solution and a TMP solution for 1 hour, transfer the blended solutions into a vacuum bottle, and perform vacuum impregnation for 1 hour.

S22: Repeatedly perform step S21 for four times to obtain a mixed solution.

S23: Store the mixed solution under normal pressure for 5-7 days to further increase the loading amount of TMP, so as to obtain a mixed solution with HNT@TMP precipitated.

S24: Separate HNT@TMP from the mixed solution by a centrifugal machine.

S25: Dry the separated HNT@TMP in an oven at 60° C.

S3: Mix and stir PEO, LiTFSI, and HNT@TMP in a certain ratio in acetonitrile to obtain PEO-based solid electrolyte slurry.

Preferably, the proportion of HNT@TMP is 40%, the ratio of PEO and LiTFSI is [EO/Li+]=16:1, and the stirring time is 12 hours, in step S3.

S4: Coat both sides of the CN support layer obtained in step S1 with the PEO-based solid electrolyte slurry obtained in step S3, and perform drying.

Preferably, both sides of the CN support layer are coated with the PEO-based solid electrolyte slurry using a coating machine in step S4.

The coating scale of the PEO-based solid electrolyte slurry is 15-35. The drying process includes: placing at room temperature for 12 hours and then placing in a vacuum oven at 60° C. for 12 hours.

S5: Perform hot pressing to obtain a PEO-based solid electrolyte.

Preferably, the hot pressing pressure is 40 MPa, the hot pressing temperature is 70° C., and the hot pressing time is 10-30 min, in step S5.

Embodiment 1 (PEO/HNT@TMP/Cellulose)

In step 1, 20 mg of porous cellulose nanopaper raw materials are uniformly dispersed in an aqueous solution for 10-30 min by an ultrasonic wall breaker having a power of 650 W to obtain a precursor solution, and the obtained precursor solution is subjected to vacuum filtration at 100° C. for 12 hours to obtain ultrathin porous cellulose nanopaper.

In step 2, an HNT solution and a TMP solution are ultrasonically blended for 1 hour and then transferred into a vacuum bottle for vacuum impregnation for 1 hour. This process is repeated four times to obtain a mixed solution. After that, the mixed solution is stored under normal pressure for 5-7 days to obtain a mixed solution with HNT@TMP precipitated, which further increases the loading capacity of TMP. Finally, HNT@TMP is separated from the mixed solution by a centrifugal machine and dried in an oven at 60° C. to obtain a multifunctional flame-retardant filler HNT@TMP.

In step 3, PEO, LiTFSI, and HNT@TMP in a certain ratio are mixed and stirred in acetonitrile to obtain PEO-based solid electrolyte slurry. The specific ratio is as follows: the proportion of HNT@TMP is 40%, the ratio of PEO and LiTFSI is [EO/Li+]=16:1, and the stirring time is 12 hours.

In step 4, both sides of the porous cellulose nanopaper are coated with the PEO-based solid electrolyte slurry by a coating machine and dried. In this step, the coating scale of the PEO-based solid electrolyte slurry is 25. The drying process includes: placing at room temperature for 12 hours and then placing in a vacuum oven at 60° C. for 12 hours.

In step 5, the dried PEO-based solid electrolyte is hot-pressed. The hot pressing pressure is 40 MPa, the hot pressing temperature is 70° C., and the hot pressing time is 25 min.

Comparative Example 1 (PEO/TMP/Cellulose)

In step 1, 20 mg of porous cellulose nanopaper raw materials are uniformly dispersed in an aqueous solution for 10-30 min by an ultrasonic wall breaker having a power of 650 W to obtain a precursor solution, and the obtained precursor solution is subjected to vacuum filtration at 100° C. for 12 hours to obtain ultrathin porous cellulose nanopaper.

In step 2, PEO, LiTFSI, and HNT in a certain ratio are mixed and stirred in acetonitrile to obtain PEO-based solid electrolyte slurry. The proportion of HNT is equal to that of HNT in Embodiment 1, the ratio of PEO and LiTFSI is [EO/Li+]=16:1, and the stirring time is 12 hours.

In step 3, both sides of the porous cellulose nanopaper are coated with the PEO-based solid electrolyte slurry by a coating machine and dried. The coating scale of the PEO-based solid electrolyte slurry is 25. The drying process includes: placing at room temperature for 12 hours and then placing in a vacuum oven at 60° C. for 12 hours.

In step 4, the dried PEO-based solid electrolyte is hot-pressed. The hot pressing pressure is 40 MPa, the hot pressing temperature is 70° C., and the hot pressing time is 25 min.

In step 5, the obtained PEO-based solid electrolyte is blended with TMP, and the proportion of TMP is equal to that of TMP in Embodiment 1.

Comparative Example 2 (PEO/Cellulose)

In step 1, 20 mg of porous cellulose nanopaper raw materials are uniformly dispersed in an aqueous solution for 10-30 min by an ultrasonic wall breaker having a power of 650 W to obtain a precursor solution, and the obtained precursor solution is subjected to vacuum filtration at 100° C. for 12 hours to obtain ultrathin porous cellulose nanopaper.

In step 2, PEO and LiTFSI in a certain ratio are mixed and stirred in acetonitrile to obtain PEO-based solid electrolyte slurry. The ratio of PEO and LiTFSI is [EO/Li+]=16:1, and the stirring time is 12 hours.

In step 3, both sides of the porous cellulose nanopaper are coated with the PEO-based solid electrolyte slurry by a coating machine and dried. The coating scale of the PEO-based solid electrolyte slurry is 25. The drying process includes: placing at room temperature for 12 hours and then placing in a vacuum oven at 60° C. for 12 hours.

In step 4, the dried PEO-based solid electrolyte is hot-pressed. The hot pressing pressure is 40 MPa, the hot pressing temperature is 70° C., and the hot pressing time is 25 min.

Comparative Example 3 (PEO)

In step 1, PEO and LiTFSI in a certain ratio are mixed and stirred in acetonitrile to obtain PEO-based solid electrolyte slurry. The ratio of PEO and LiTFSI is [EO/Li+]=16:1, and the stirring time is 12 hours.

In step 2, the obtained PEO-based solid electrolyte slurry is poured onto a polytetrafluoroethylene mold, dried at room temperature for 12 hours, and then dried under a vacuum environment of 60° C. for 12 hours.

To verify the PEO-based solid electrolytes prepared in Embodiment 1 and Comparative Examples 1-3, the following performance tests are performed:

1. Verification test of multifunctional flame-retardant filler HNT@TMP prepared in Embodiment 1 of the present invention:

(1) Transmission Electron Microscope (TEM) Characterization

The result of TEM characterization of the multifunctional flame-retardant filler HNT@TMP prepared in Embodiment 1 of the present invention is as shown in FIG. 1. It can be seen that the prepared multifunctional flame-retardant filler HNT@TMP has element P.

(2) Infrared Spectroscopy (FTIR) Characterization

Figure 2:
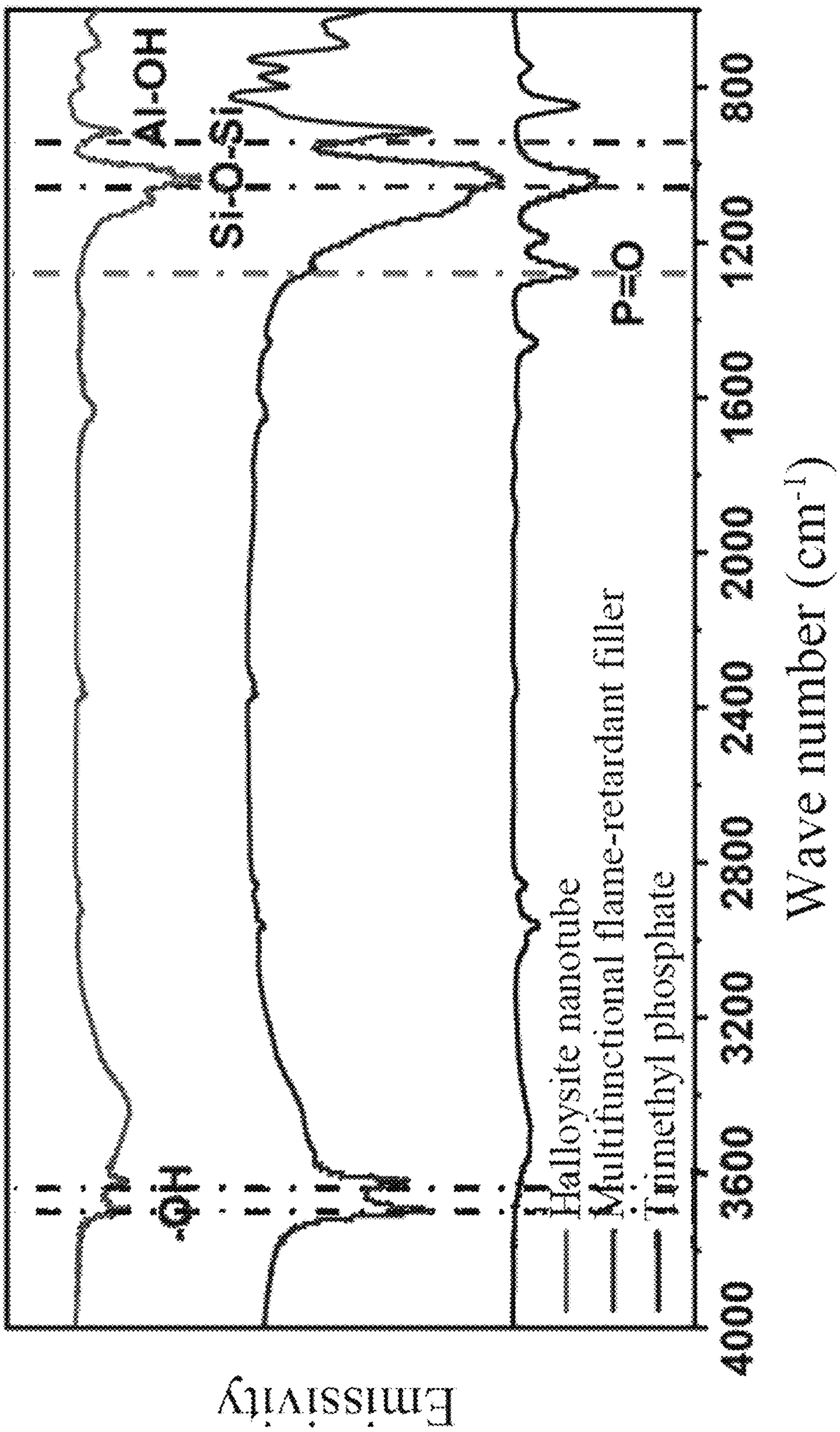
FIG. 2 is an FTIR diagram of a multifunctional flame-retardant filler HNT@TMP prepared in Embodiment 1 of the present invention.

FIG. 2 is an FTIR characterization of a multifunctional flame-retardant filler HNT@TMP prepared in Embodiment 1 of the present invention. From the result as shown in FIG. 2, it can be seen that the prepared multifunctional flame-retardant filler HNT@TMP has a characteristic peak P=O.

(3) BET Characterization

Figure 3:
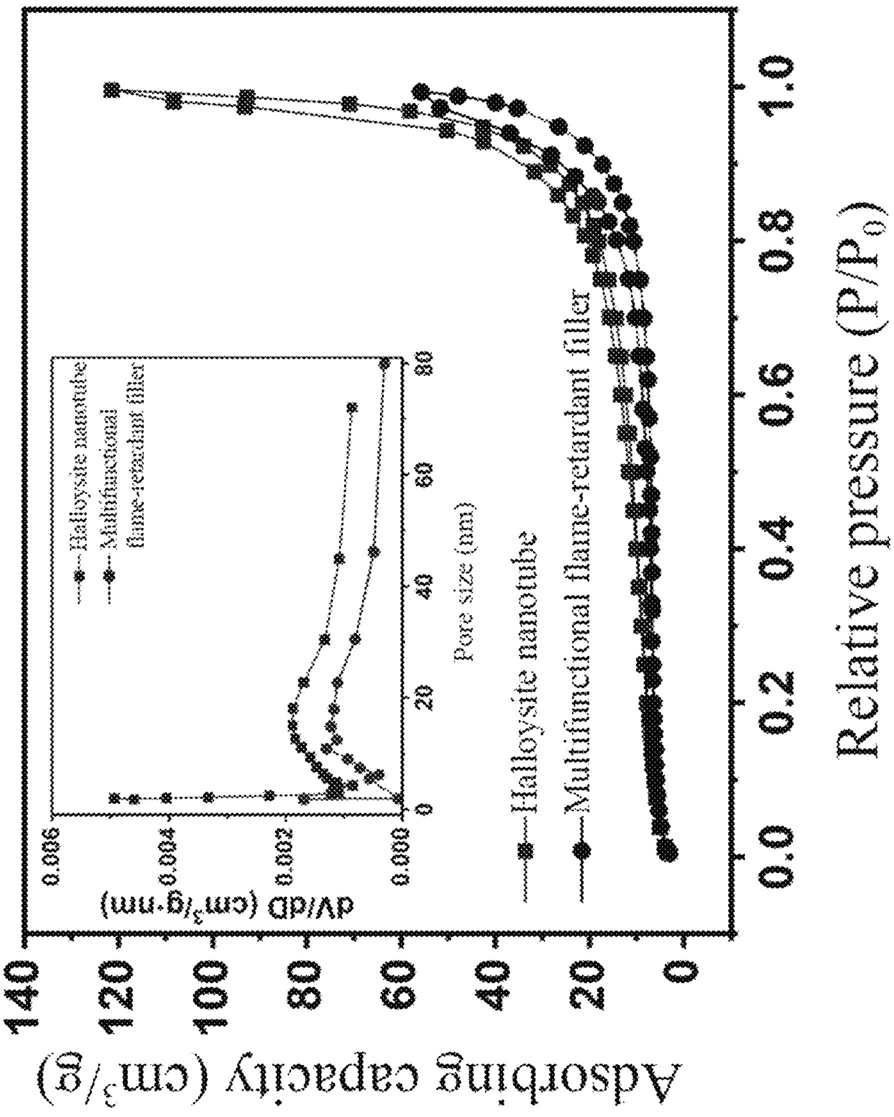
FIG. 3 is a BET diagram of a multifunctional flame-retardant filler HNT@TMP prepared in Embodiment 1 of the present invention.

FIG. 3 is a BET characterization of a multifunctional flame-retardant filler HNT@TMP prepared in Embodiment 1 of the present invention. From the result as shown in FIG. 3, it can be seen that the pore size and pore volume of the prepared multifunctional flame-retardant filler HNT@TMP are both reduced.

(4) Lithium Symmetric Battery Cycle Stability Test

Figure 4:
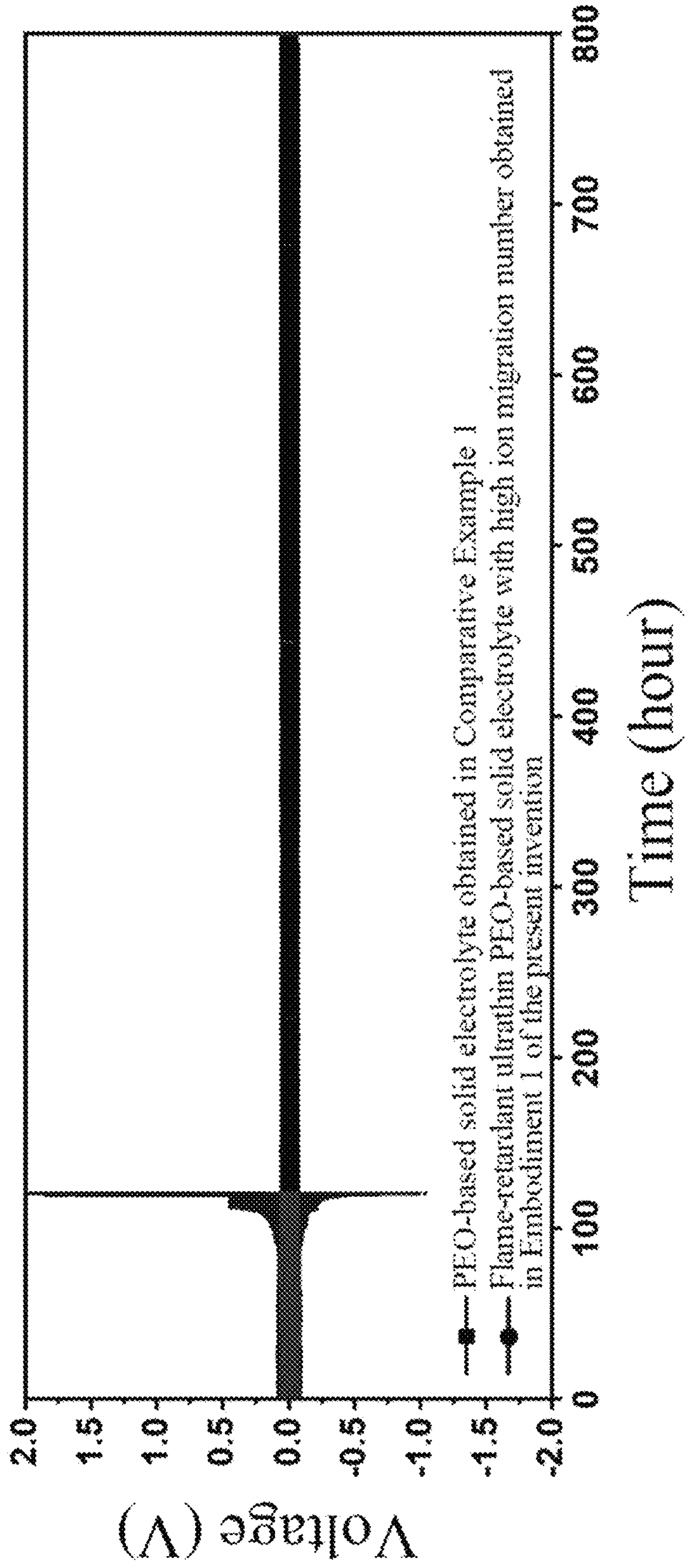
FIG. 4 is a comparison diagram of lithium symmetric battery cycle stability of a flame-retardant ultrathin PEO-based solid electrolyte with high ion migration number obtained in Embodiment 1 of the present invention and a PEO-based solid electrolyte obtained in Comparative Example 1.

FIG. 4 is a lithium symmetric battery cycle stability test of a flame-retardant ultrathin PEO-based solid electrolyte with high ion migration number obtained in Embodiment 1 of the present invention and a PEO-based solid electrolyte obtained in Comparative Example 1. From the result as shown in FIG. 3, it can be seen that a flame-retardant ultrathin PEO-based solid electrolyte with high ion migration number and a lithium metal negative electrode have better stability.

(5) Scanning Electron Microscope (SEM) Characterization

Figure 5A:
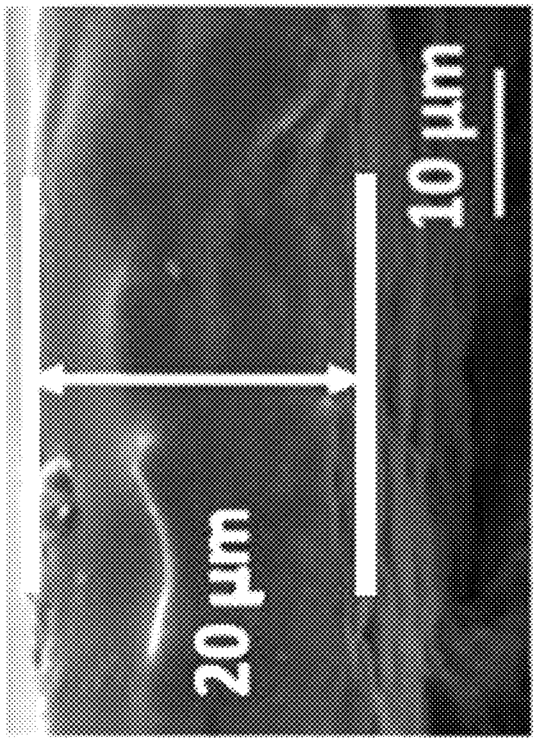
FIGS. 5A-5B are an SEM diagrams of a flame-retardant ultrathin PEO-based solid electrolyte with high ion migration number obtained in Embodiment 1 of the present invention and a PEO-based solid electrolyte obtained in Comparative Example 2.
Figure 5B:
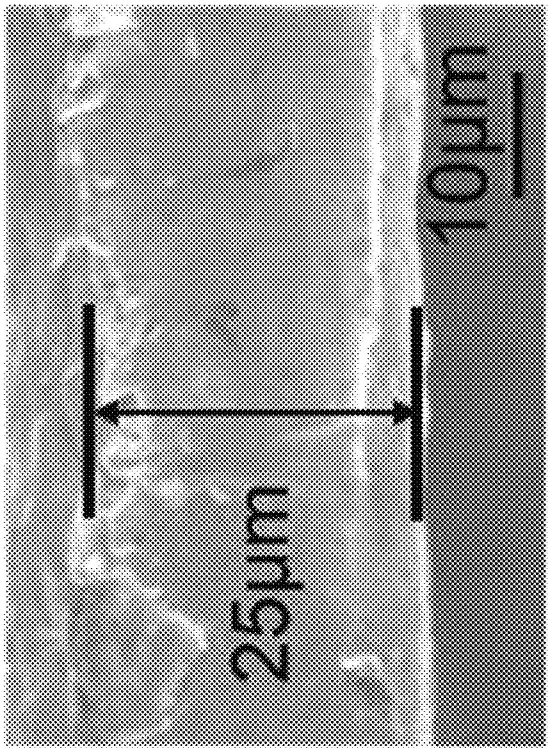
Figure 9A:
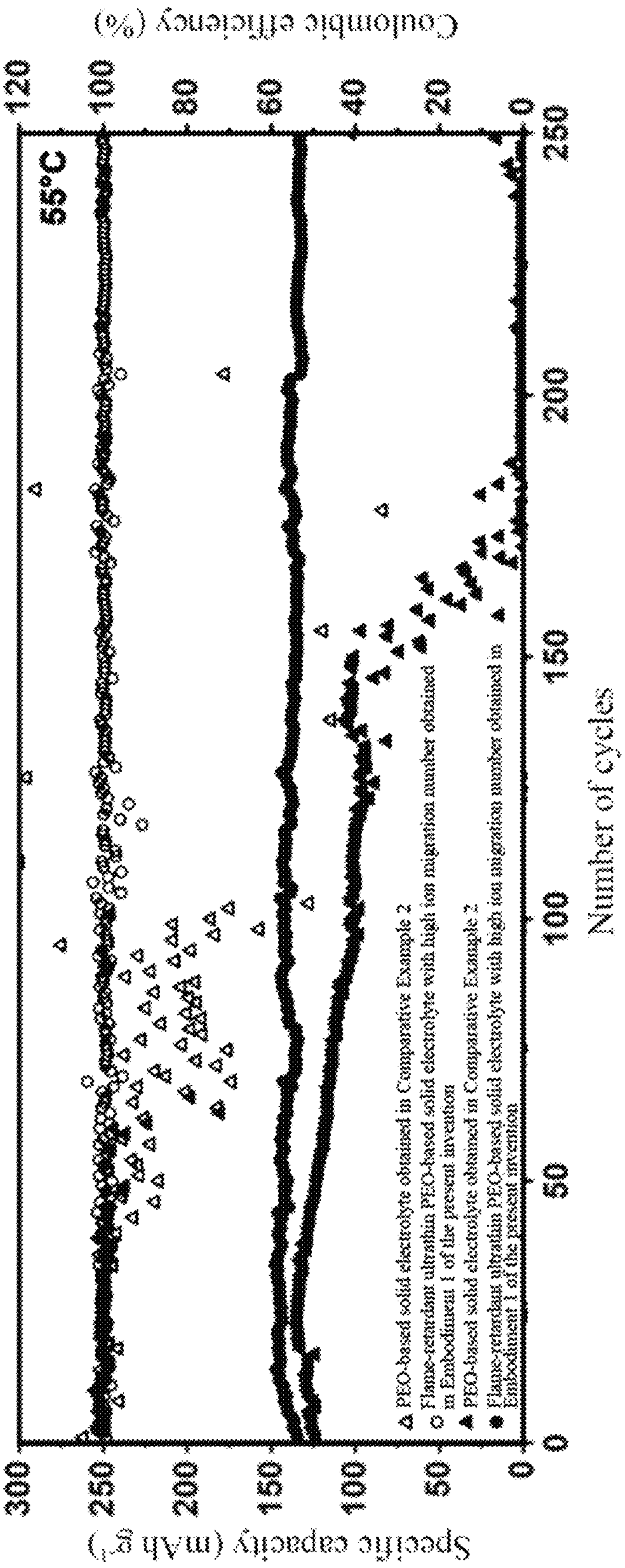
FIGS. 9A-9C are comparison diagrams of cycle and rate performances of a flame-retardant ultrathin PEO-based solid electrolyte with high ion migration number obtained in Embodiment 1 of the present invention and a PEO-based solid electrolyte obtained in Comparative Example 2 and Comparative Example 3.
Figure 9B:
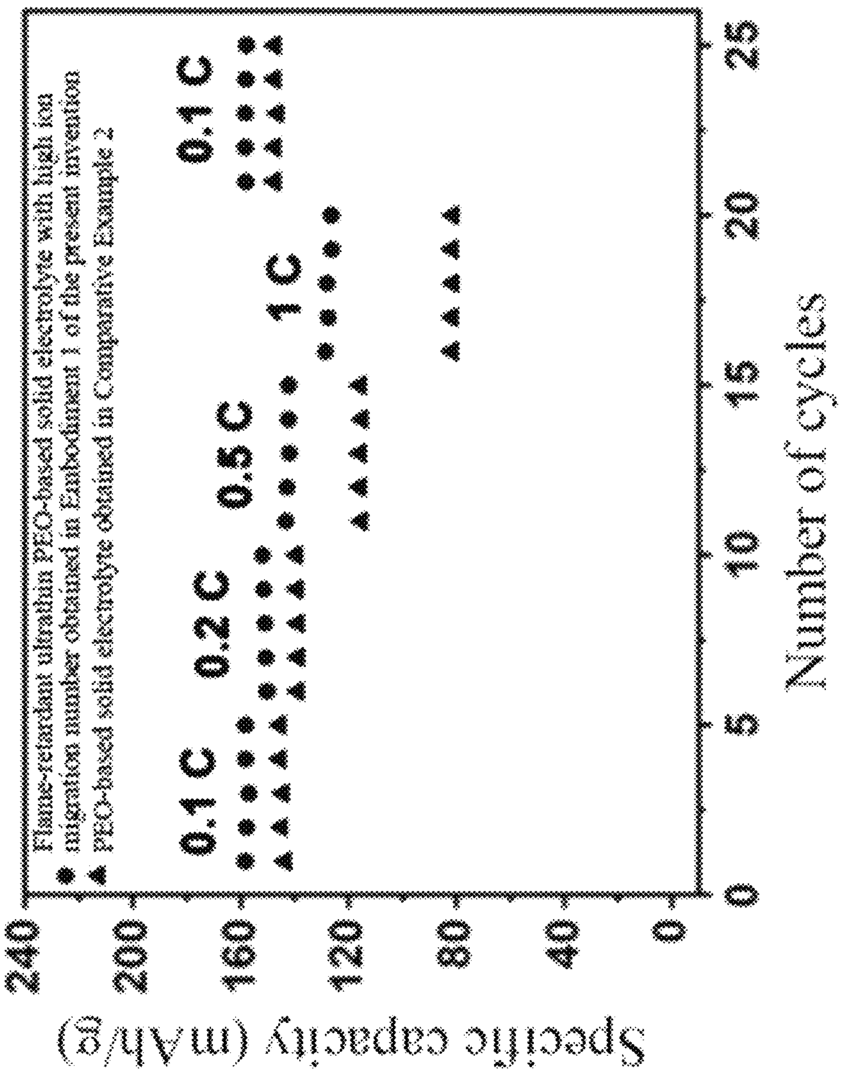
Figure 9C:
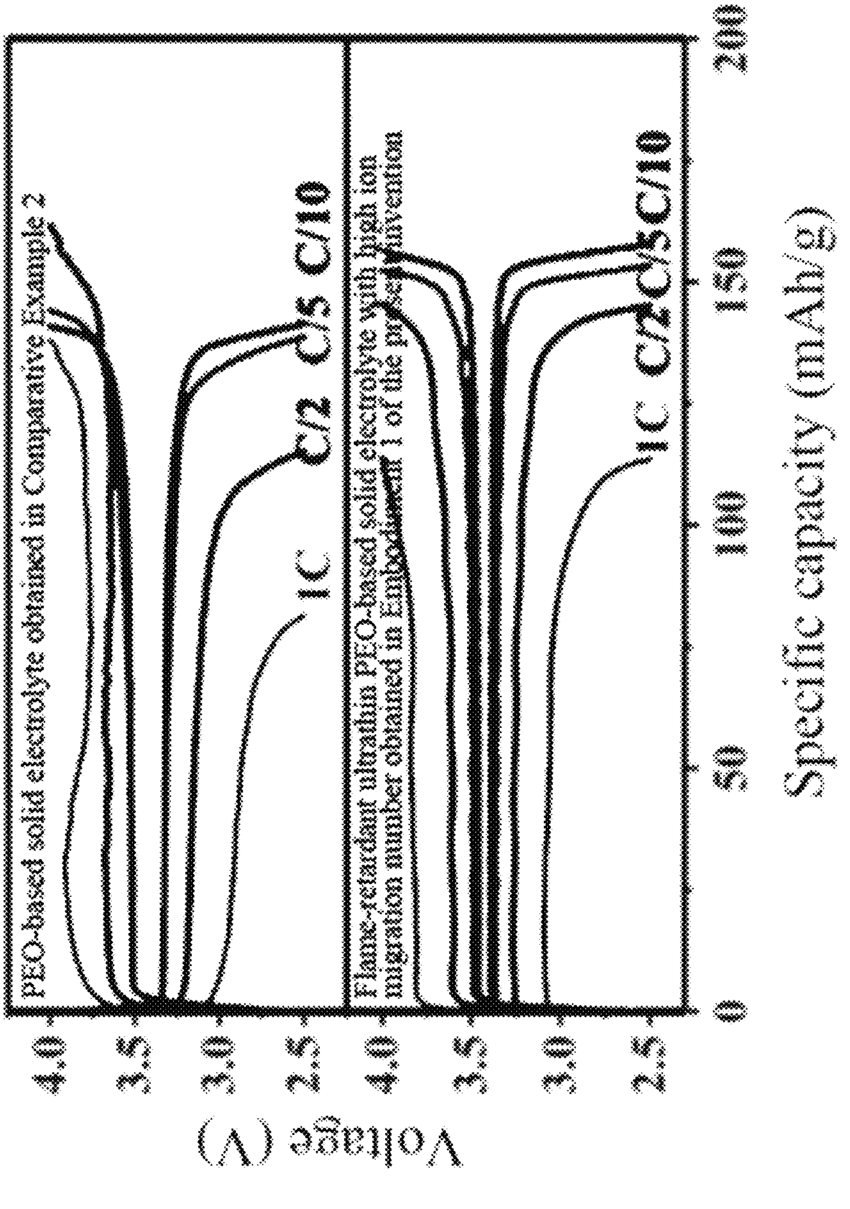

FIGS. 5A-5B are SEM diagrams of a flame-retardant ultrathin PEO-based solid electrolyte with high ion migration number obtained in Embodiment 1 of the present invention and a PEO-based solid electrolyte obtained in Comparative Example 2. From the result as shown in FIGS. 9A-9C, it can be seen that the prepared ultrathin PEO-based solid electrolyte has a thickness of about 20-25 μm.

2. Comparison test of PEO-based solid electrolyte obtained in Embodiment 1 of the present invention and PEO-based solid electrolyte obtained in Comparative Example 2 and Comparative Example 3:

(1) Ionic Conductivity Test

Figure 6:
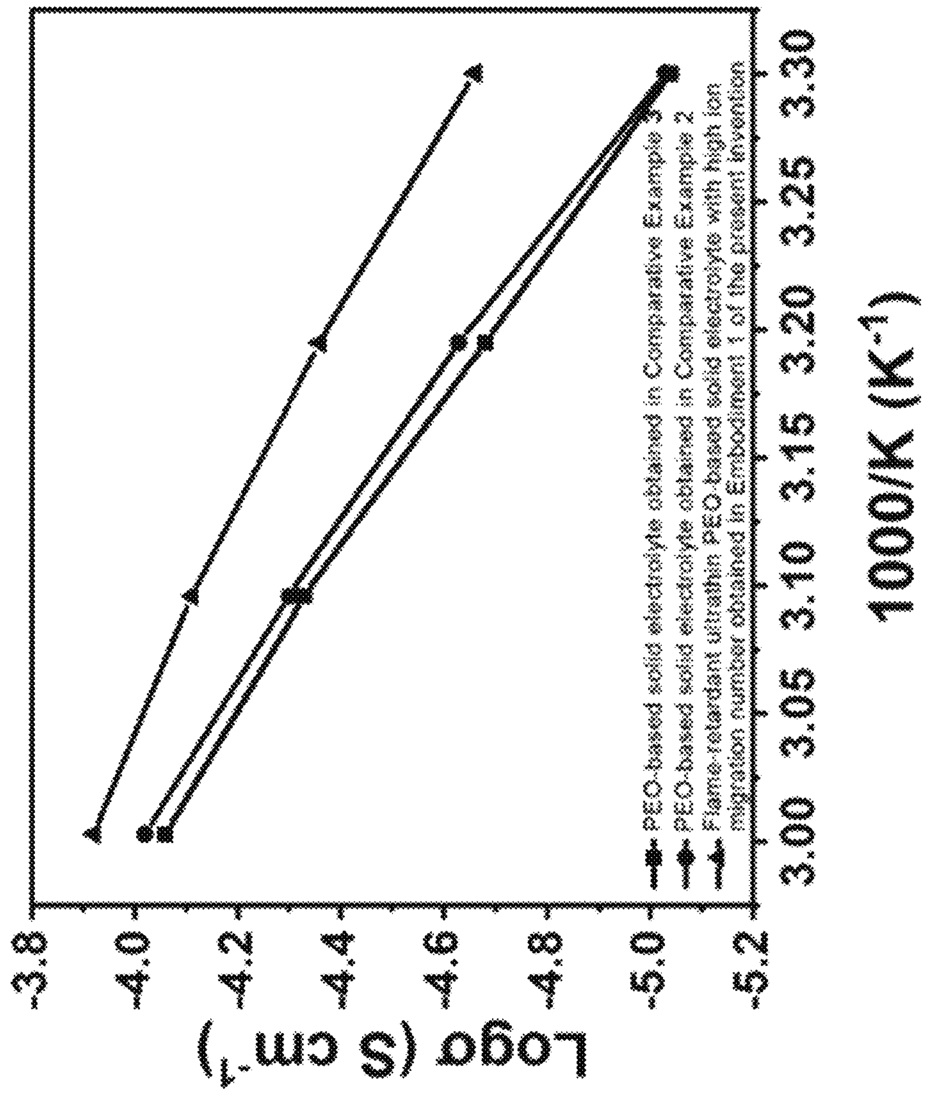
FIG. 6 is a comparison diagram of ionic conductivity of a flame-retardant ultrathin PEO-based solid electrolyte with high ion migration number obtained in Embodiment 1 of the present invention and a PEO-based solid electrolyte obtained in Comparative Example 2 and Comparative Example 3.

FIG. 6 is a comparison of ionic conductivity of a flame-retardant ultrathin PEO-based solid electrolyte with high ion migration number obtained in Embodiment 1 of the present invention and a PEO-based solid electrolyte obtained in Comparative Example 2 and Comparative Example 3. From the result as shown in FIG. 6, it can be observed that the flame-retardant ultrathin PEO-based solid electrolyte with high ion migration number prepared in Embodiment 1 has higher ionic conductivity.

(2) Mechanical Performance Test

Figure 7:
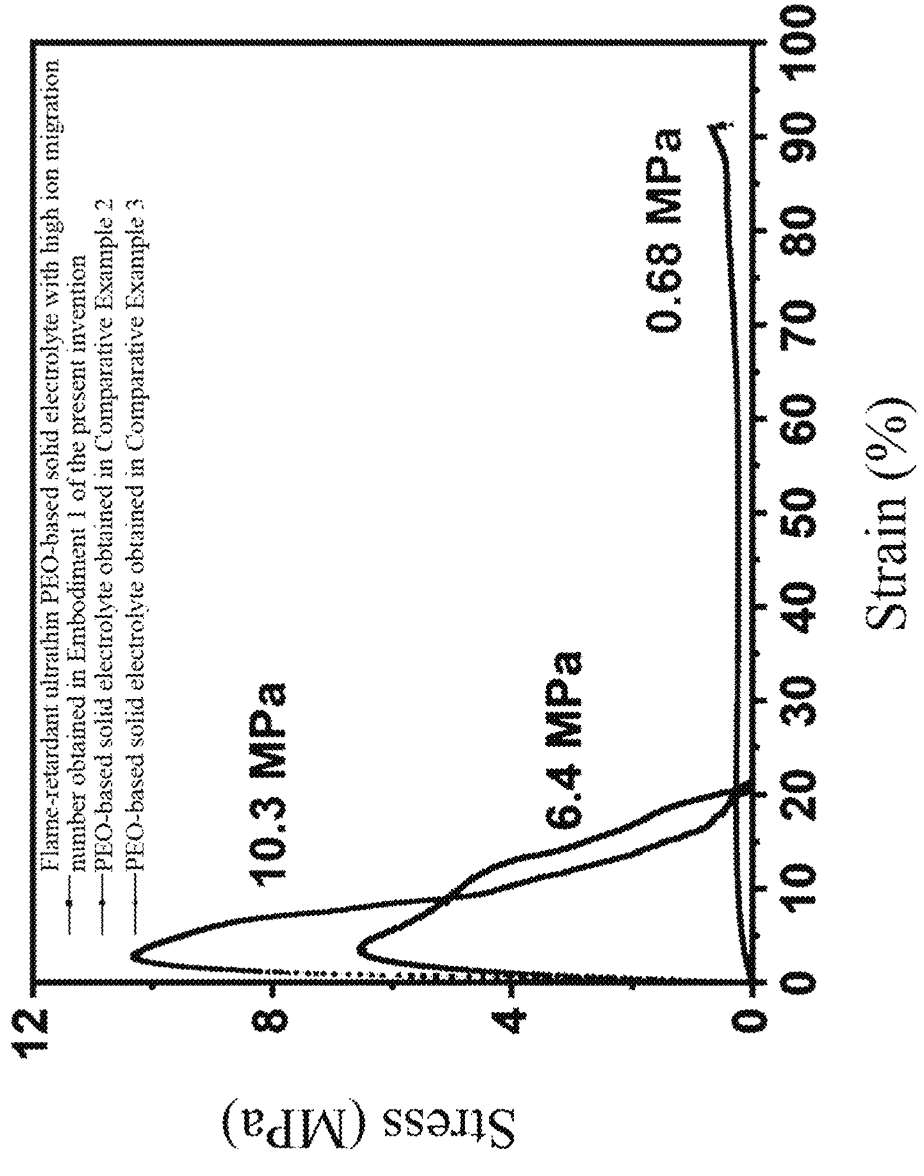
FIG. 7 is a comparison diagram of tensile properties of a flame-retardant ultrathin PEO-based solid electrolyte with high ion migration number obtained in Embodiment 1 of the present invention and a PEO-based solid electrolyte obtained in Comparative Example 2 and Comparative Example 3.

FIG. 7 is a comparison of tensile properties of a flame-retardant ultrathin PEO-based solid electrolyte with high ion migration number obtained in Embodiment 1 of the present invention and a PEO-based solid electrolyte obtained in Comparative Example 2 and Comparative Example 3. From the result as shown in FIG. 7, it can be observed that the mechanical performance of the flame-retardant ultrathin PEO-based solid electrolyte with high ion migration number prepared in Embodiment 1 is greatly improved.

(3) Lithium Ion Migration Number Test

Figure 8A:
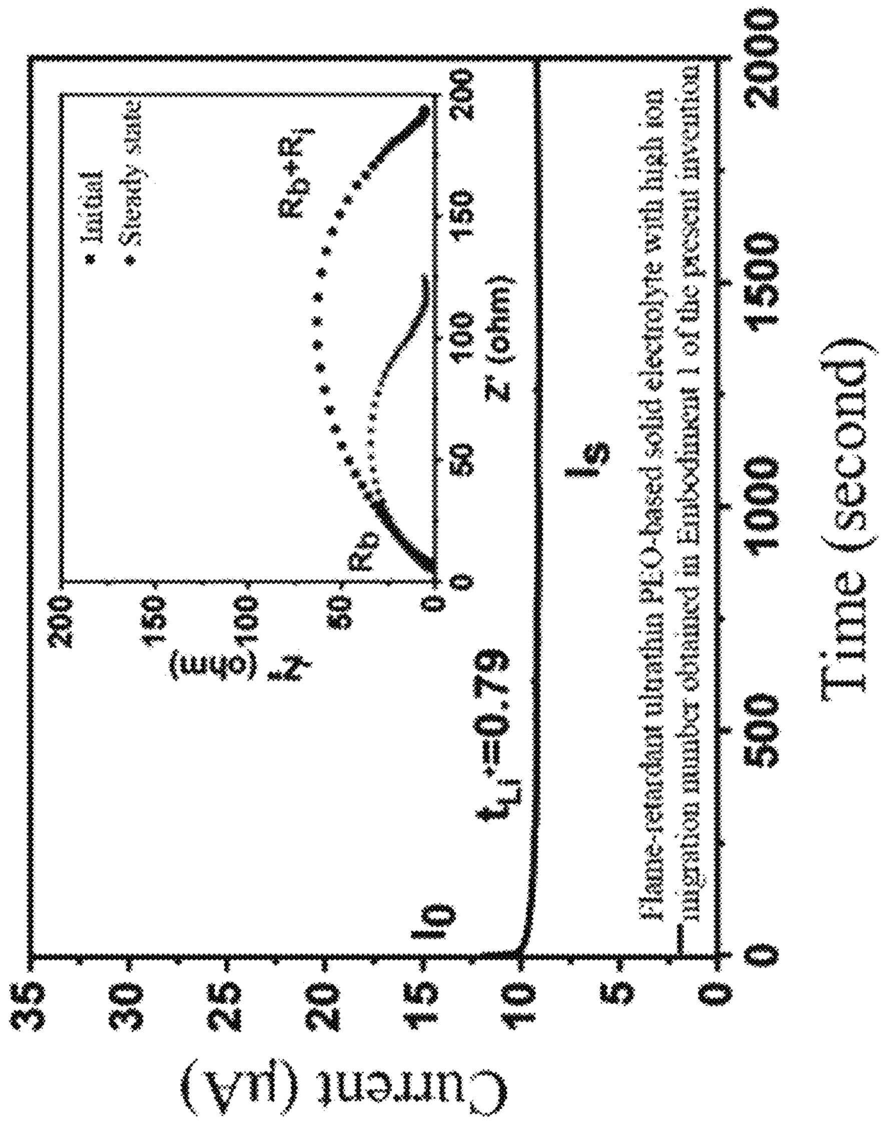
FIG. 8A is an ion migration number result diagram of a flame-retardant ultrathin PEO-based solid electrolyte with high ion migration number obtained in Embodiment 1 of the present invention.
Figure 8B:
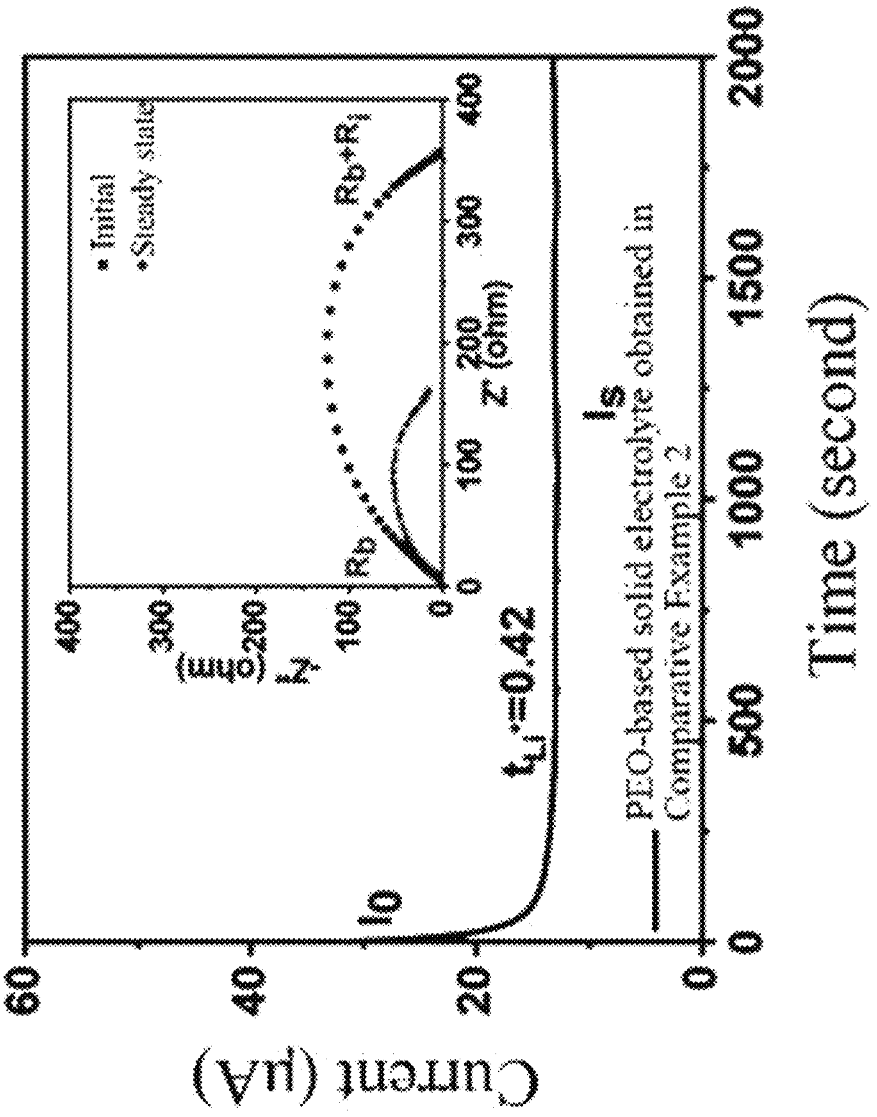
FIG. 8B is an ion migration number result diagram of a PEO-based solid electrolyte obtained in Comparative Example 2.
Figure 8C:
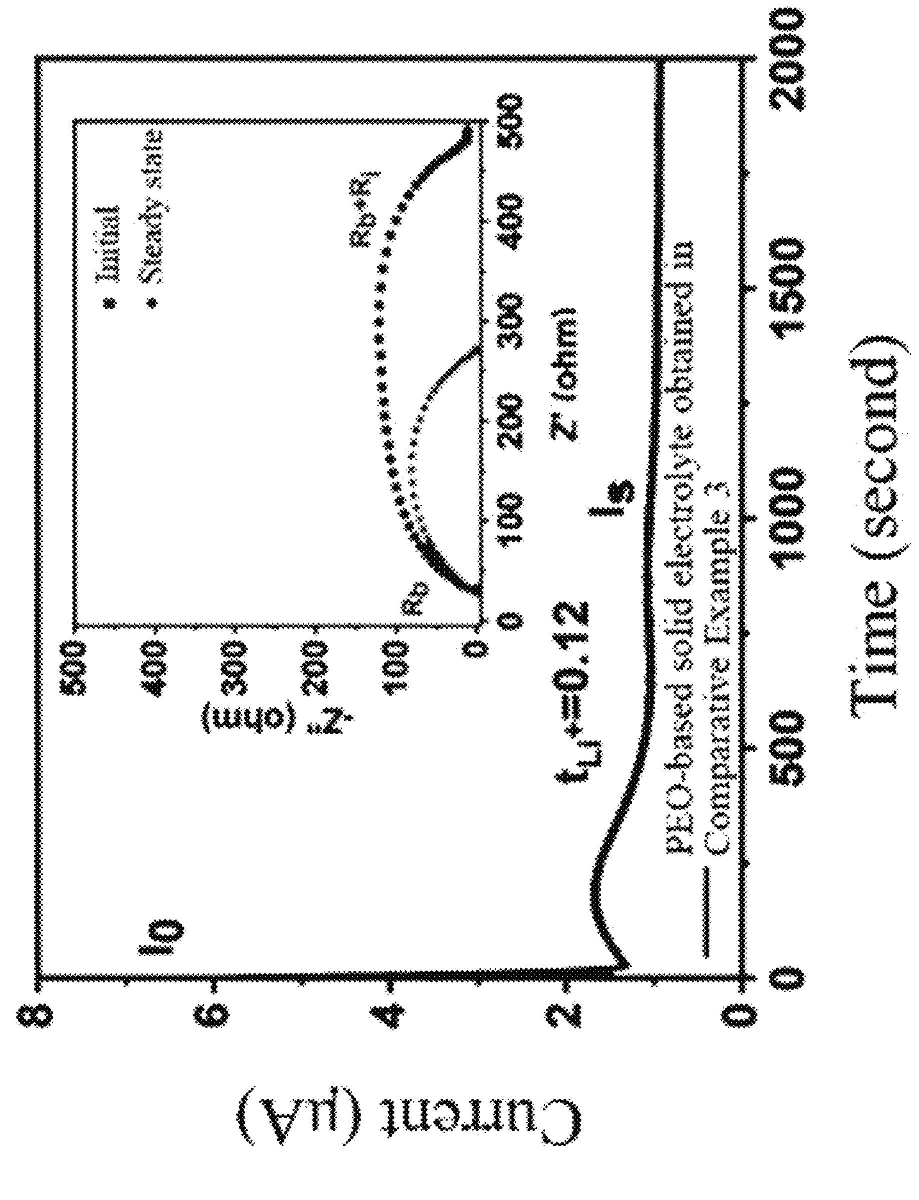
FIG. 8C is an ion migration number result diagram of a PEO-based solid electrolyte obtained in Comparative Example 3.

A lithium ion migration number test is performed on the flame-retardant ultrathin PEO-based solid electrolyte with high ion migration number obtained in Embodiment 1 of the present invention and the PEO-based solid electrolyte obtained in Comparative Example 2 and Comparative Example 3. From the result as shown in FIGS. 8A-8C, it can be observed that the flame-retardant ultrathin PEO-based solid electrolyte with high ion migration number prepared in Embodiment 1 has higher ion migration number ($t_{Li+}$ is 0.67).

(4) Electrochemical Performance Test

The flame-retardant ultrathin PEO-based solid electrolyte with high ion migration number obtained in Embodiment 1 of the present invention and the PEO-based solid electrolyte obtained in Comparative Example 2 and Comparative Example 3 match a $LiFePO_4$ positive electrode and a lithium metal negative electrode to assemble a button battery for an electrochemical performance test. According to the result as shown in FIGS. 9A-9C, the flame-retardant ultrathin PEO-based solid electrolyte with high ion migration number prepared in Embodiment 1 has better cycle performance and rate performance.

Figure 10A:
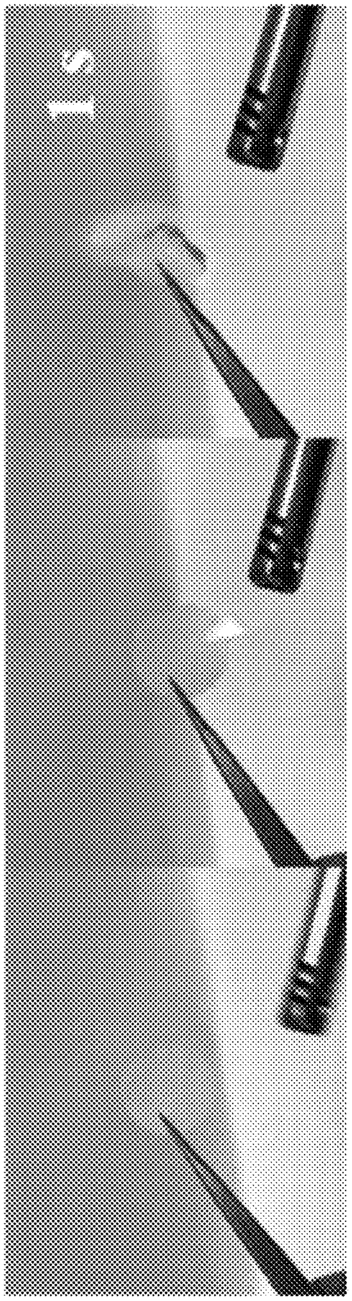
FIGS. 10A-10B are comparison diagrams of flame retardance of a flame-retardant ultrathin PEO-based solid electrolyte with high ion migration number obtained in Embodiment 1 of the present invention and a PEO-based solid electrolyte obtained in Comparative Example 2.
Figure 10B:
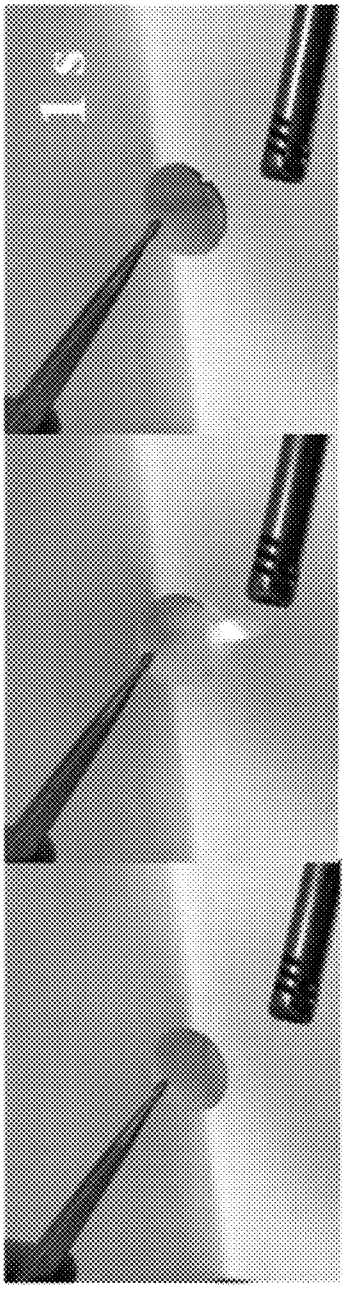
Figure 11:
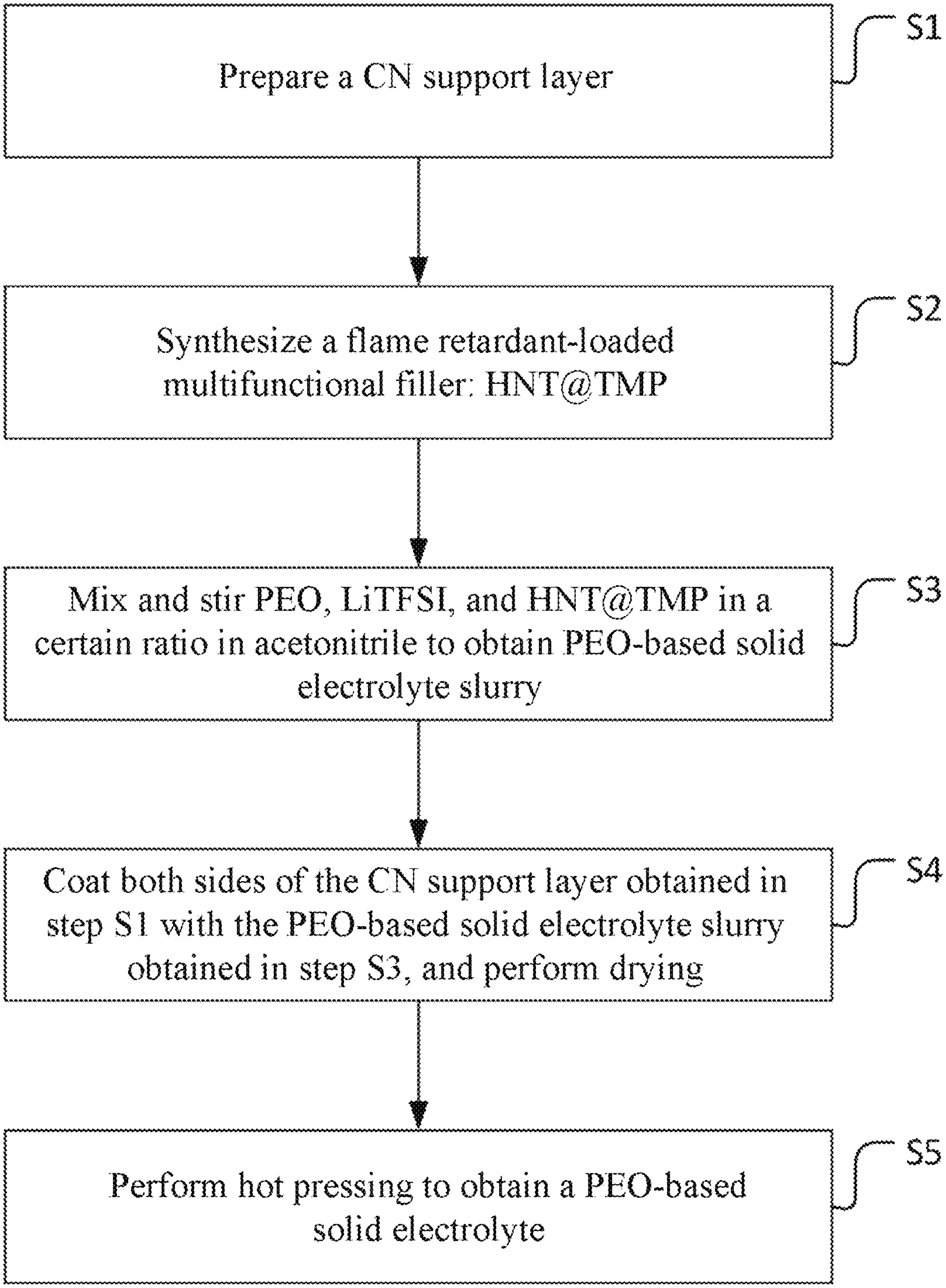
FIG. 11 is a flowchart of a preparation method of a flame-retardant ultrathin PEO-based solid electrolyte according to the present invention.

(5) Ignition Characterization:

FIGS. 10A-10B are ignition tests of a flame-retardant ultrathin PEO-based solid electrolyte with high ion migration number obtained in Embodiment 1 of the present invention and a PEO-based solid electrolyte obtained in Comparative Example 2. According to the result as shown in FIGS. 10A-10B, the flame-retardant ultrathin PEO-based solid electrolyte with high ion migration number has self-extinguishing property.

From Embodiment 1 and Comparative Example 1, it can be seen that the multifunctional flame-retardant filler HNT@TMP prepared in the present invention effectively avoids the negative influence caused by the direct addition of a flame retardant in an electrolyte. From Embodiment 1 and Comparative Examples 2 and 3, it can be seen that in the thermal runaway process of a battery, due to the increase of temperature, the flame retardant in the HNT gasifies and captures free radicals in the combustion process of polymer, thus effectively inhibiting the combustion of the polymer electrolyte. At the same time, the unique charge distribution structure of "positive inside and negative outside" of the HNT can promote the dissociation of lithium salt and produce more freely conductible lithium ions, thereby accelerating the transmission of the lithium ions in the PEO-based electrolyte. Furthermore, the mechanical strength of the ultrathin PEO electrolyte is ensured through porous cellulose nanopaper (CN) with mechanical flexibility and thermal stability. Therefore, the flame-retardant ultrathin PEO-based solid electrolyte (having a thickness of 20-25 μm) with high ion migration number prepared in the present invention has better mechanical performance, ionic conductivity, lithium ion migration number, and flame retardance, and the assembled battery has better cycle performance and rate performance. Based on the above advantages, the electrolyte membrane is conducive to the realization of high energy density and high safety performance of all-solid-state lithium metal batteries.

Therefore, in the present invention, the preparation method of the flame-retardant ultrathin PEO-based solid electrolyte is adopted, a multifunctional flame-retardant filler (HNT@TMP) and an ultrathin porous cellulose nanopaper serve as a support layer, and a flame-retardant ultrathin PEO-based solid electrolyte with high ion migration number is prepared. The multifunctional flame-retardant filler (HNT@TMP) and the ultrathin porous cellulose nanopaper (CN) with mechanical flexibility and thermal stability serve as the support layer, which can achieve the flame retardance, excellent mechanical performance and electrochemical performance of the PEO-based solid electrolyte, achieves ultrathin performance, and is conducive to achieving high energy density of a lithium battery.

Finally, it should be noted that the above embodiments are intended only to illustrate and not to limit the technical solution of the present invention. Although the present invention has been described in detail with reference to the preferred embodiments, it should be understood by those of ordinary skill in the art that modifications or equivalents may be made to the technical solution of the present invention and that such modifications or equivalents do not depart the modified technical solution from the spirit and scope of the technical solution of the present invention.

What is claimed is:

1. A preparation method of a flame-retardant ultrathin polyethylene oxide (PEO)-based solid electrolyte, comprising following steps:

S1: preparing a cellulose nanopaper (CN) support layer;

S2: synthesizing a flame retardant-loaded multifunctional filter: trimethyl phosphate (TMP) adsorbed into an interior of halloysite nanotubes (HNT) (HNT@TMP);

S3: mixing and stirring PEO, lithium bis(trifluoromethanesulphonyl)imide (LiTFSI), and the HNT@TMP in a ratio in acetonitrile to obtain a PEO-based solid electrolyte slurry;

S4: coating two sides of the CN support layer obtained in S1 with the PEO-based solid electrolyte slurry obtained in S3 to obtain a coated product, and performing drying on the coated product to obtain a dried product; and S5: performing a hot pressing on the dried product to obtain a PEO-based solid electrolyte, wherein the TMP is adsorbed in an interior of the HNT by a vacuum impregnation to synthesize the HNT@TMP in S2;

S2 comprises following sub-steps:

S21: ultrasonically blending an HNT solution and a TMP solution for 1 hour to obtain a blended solution, transferring the blended solution into a vacuum bottle, and performing the vacuum impregnation for 1 hour;

S22: repeatedly performing S21 for four times to obtain a first mixed solution;

S23: storing the first mixed solution under an atmospheric pressure for 5-7 days to further increase a loading amount of the TMP to obtain a second mixed solution with the HNT@TMP precipitated;

S24: separating the HNT@TMP from the second mixed solution by a centrifugal machine; and S25: drying the separated HNT@TMP in an oven at 60° C.;

wherein in S3, a proportion of the HNT@TMP is 40%, a ratio of the PEO and the LiTFSI is [EO/Li+]=16:1, and a stirring time is 12 hours; and a thickness of the CN support layer in S1 is 5-50 μm.

2. The preparation method of the flame-retardant ultrathin PEO-based solid electrolyte according to claim 1, wherein S1 comprises following sub-steps:

S11: uniformly dispersing CN raw materials in an aqueous solution to obtain a precursor solution;

S12: performing a vacuum filtration on the precursor solution to obtain a filtered solution; and S13: performing drying on the filtered solution to obtain the CN support layer.

3. The preparation method of the flame-retardant ultrathin PEO-based solid electrolyte according to claim 2, wherein the CN raw materials are dispersed in the aqueous solution by an ultrasonic wall breaker in S11, a power of the ultrasonic wall breaker is 650 W, a dispersion time is 10-30 min; and in S13, a drying temperature is 100° C., and a drying time is 12 hours.

4. The preparation method of the flame-retardant ultrathin PEO-based solid electrolyte according to claim 1, wherein in S4, the two sides of the CN support layer are coated with the PEO-based solid electrolyte slurry by using a coating machine; and a drying process comprises: placing the coated product at room temperature for 12 hours and then placing the coated product in a vacuum oven at 60° C. for 12 hours.

5. The preparation method of the flame-retardant ultrathin PEO-based solid electrolyte according to claim 1, wherein in S5, a hot pressing pressure is 40 MPa, a hot pressing temperature is 70° C., and a hot pressing time is 10-30 min.

* * * * *